March 5, 1957    J. F. STEPHENS    2,784,129
READILY MOUNTABLE PIPE COVERING
Filed May 1, 1953    2 Sheets-Sheet 1
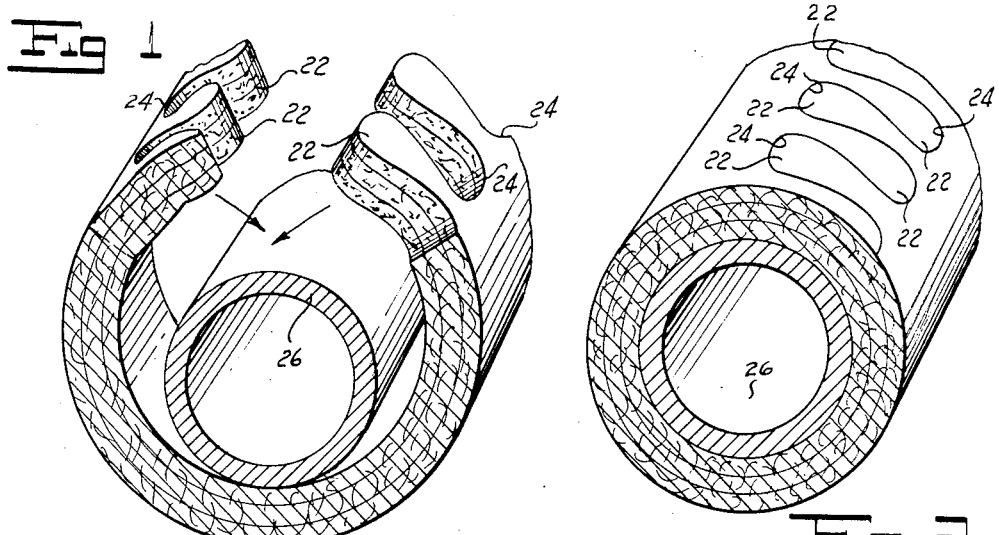
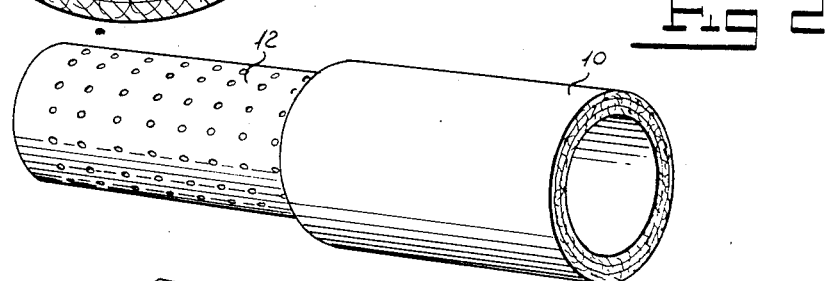
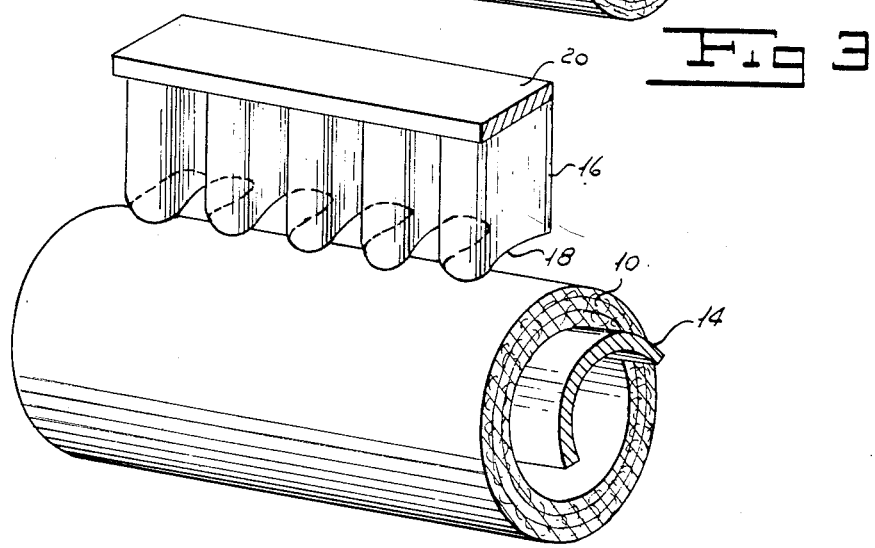
INVENTOR.
JOSEPH F. STEPHENS
BY
ATTORNEY March 5, 1957
J. F. STEPHENS
2,784,129
READILY MOUNTABLE PIPE COVERING
Filed May 1, 1953
2 Sheets-Sheet 2
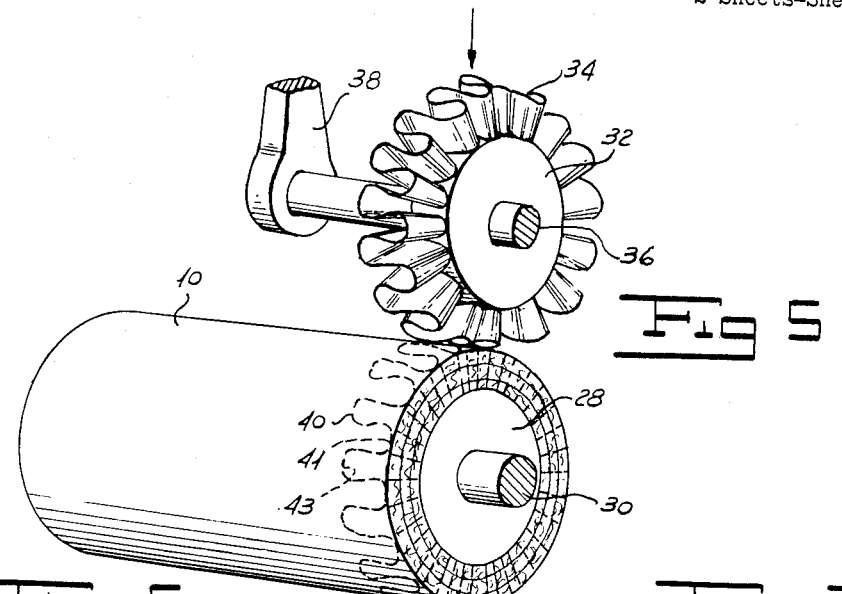
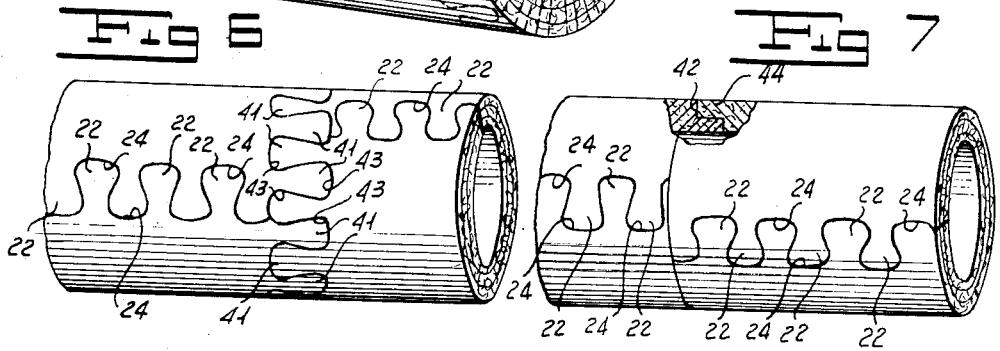
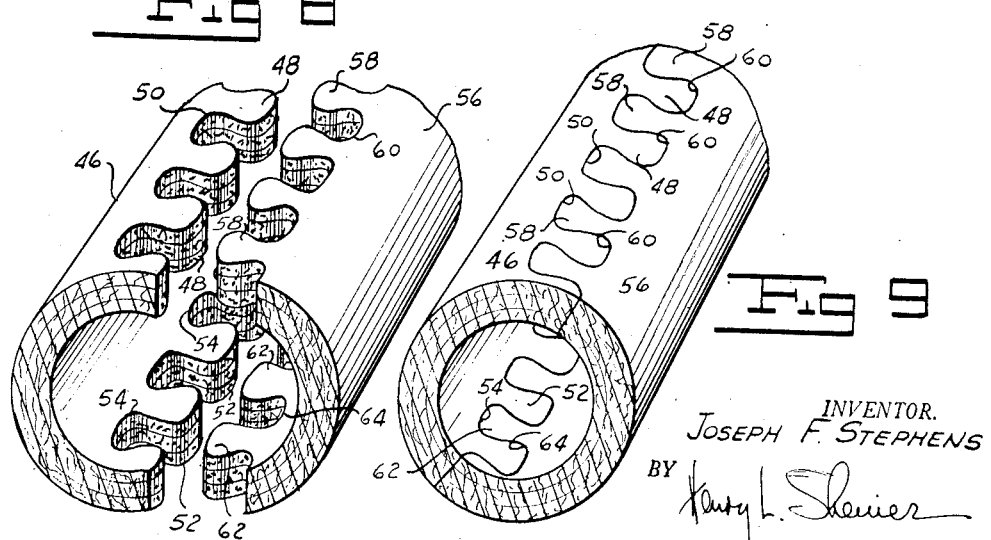
INVENTOR.
JOSEPH F. STEPHENS
BY
ATTORNEY

United States Patent Office 2,784,129
Patented Mar. 5, 1957

2,784,129
READILY MOUNTABLE PIPE COVERING

Joseph F. Stephens, Kansas City, Mo., assignor to Gustin-Bacon Manufacturing Co., Kansas City, Mo., a corporation of Missouri Application May 1, 1953, Serial No. 352,397

3 Claims. (Cl. 154—44)

My invention relates to insulating pipe coverings and more particularly to a readily mountable pipe covering in which the means for retaining the pipe covering on the pipe and securing it thereto is formed from the insulating material composing the covering so that no independent retaining or securing means need be employed.

In pipe coverings of the prior art some means is provided for securing the covering to and retaining the covering on the pipe to which it is applied. Where bulk insulating material is employed it is necessary to provide a continuous supporting and retaining means along the length of the pipe to which insulation is to be applied. That is, a sleeve or envelope must surround the insulating material along its length. To avoid the use of such bulk insulation and the associated sleeves or envelopes, other more rigid types of pipe covering have been developed. For example, another type of pipe covering includes semicylindrical sections which are molded from insulating material so as to be substantially rigid. This type of pipe covering also necessitates the use of a securing and retaining means which may be a muslin or a canvas envelope wrapped around the semicylindrical sections. The ends of the envelope may be secured by an adhesive. However, if the pipe is in a damp location or carries heat, the adhesive may deteriorate after a period of time and the envelope may fall from the covering and no longer retain it in place. Metal bands may also be used to secure such a covering. The metal bands may also deteriorate owing to corrosion, especially in damp locations, and no longer fulfill their function of retaining the covering of the pipe. Even where a sufficiently resilient insulating material is available so that a pipe covering may be formed which can be slit along its length and sprung into position on the pipe, some securing means is employed. For example, staples may be employed to hold the edges of the slit together. The staples, however, because of their metal composition develop localized hot spots along the length of the pipe and are subject to corrosion in the same manner as the metal bands. It is obvious that the independent fastening means has a relatively short life as compared with the insulating material with which it is used. In addition to the difficulties resulting from the failure of the fastening means employed, considerable expense in labor and material is encountered in the installation of pipe coverings employing independent securing means. It will be appreciated that the separate operation entailed in applying fastening means to the pipe covering greatly increases the cost of applying insulation.

I have invented a readily mountable pipe covering in which the means for retaining the covering on and securing the covering to the pipe is formed from the insulating material itself. Therefore, it is not necessary to employ an independent fastening means which may deteriorate more rapidly than the insulating material itself, and the expense of installing insulating pipe coverings is reduced considerably.

One object of my invention is to provide a readily mountable pipe covering in which the means for retaining the covering on the pipe comprises the insulating material from which the covering is formed.

Another object of my invention is to provide a readily mountable pipe covering which may be secured to a pipe without the necessity of employing independent securing means.

A further object of my invention is to provide an improved pipe covering in which the means for retaining the covering on a pipe is interlocking means formed on the body of the covering.

Still another object of my invention is to provide a pipe covering wherein means are formed on the body of the covering for joining sections of covering along the length of the pipe in end-to-end relationship.

Yet another object of my invention is to provide an improved pipe covering having a means formed thereon for securing the covering to the pipe such that the covering, in place on a pipe, appears as a smooth continuous surface.

Another object of my invention is to provide a pipe covering of hollow cylindrical form having a longitudinal slit by means of which the covering may be sprung into position on the pipe and interlocking means formed on the edges of the slit for retaining the covering on the pipe.

A still further object of my invention is to provide a pipe covering including a pair of semicylindrical sections and interlocking means formed on the longitudinal edges of the sections for retaining the covering in place on the pipe.

Other and further objects of my invention will appear from the following description.

In general my invention contemplates the provision of a readily mountable pipe covering formed of a suitable insulating material wherein the means for securing the covering to and retaining the covering on the pipe to which it is applied is formed from the insulating material making up the covering. My pipe covering is first formed as a tube of insulating material of appropriate dimensions and slit longitudinally along its wall to form interlocking joining means which may be a series of flaring tongues or dovetails or the like on one edge which are adapted to fit into corresponding notches or re-entrant portions on the other edge.

If the material from which my covering is to be formed is sufficiently flexible, I may provide a single axially extending cut so that the tube may be flexed to open the cut and be sprung into place about the pipe. In the event that the material from which the covering is to be formed is relatively rigid, I may form it as a tube and make a pair of diametrically opposite cuts so that joining means are formed on the longitudinal edges of a pair of semicylinders and the covering joined at two places with a minimum of flexing. If desired, the two semicylinders could first be molded and the cuts made thereafter. In addition, I may make circumferential cuts through the tube wall at its ends to form interlocking means for joining a number of sections along the length of the pipe to which the covering is to be applied. Then too, the ends may be formed with nesting means.

In the accompanying drawings which form part of the instant specification and which are to be read in conjunction therewith and in which like reference numerals are used to indicate like parts in the various views:

Figure 1 is a fragmentary perspective view of a section of my readily mountable pipe covering with the covering flexed to a position where the cut is open so that the covering may be applied to a pipe.

Figure 2 is a fragmentary perspective view showing a section of the covering secured in place on a length of pipe.

Figure 3 is a perspective view on a reduced scale showing the relation between a tube of insulating material forming a section of pipe covering and the mandrel on which the tube was formed during the removal of the tube from the mandrel.

Figure 4 is a perspective view of a tube of insulating material forming a pipe covering on an arbor and its relation to a cutting tool for forming longitudinal interlocking means just before the cutting operation.

Figure 5 is a perspective view of a tube of insulating material forming a pipe covering in position on an arbor and in relation to a cutter adapted to form circumferential interlocking means at the ends of a section.

Figure 6 is a perspective view on a reduced scale of my readily mountable pipe covering showing the longitudinal and circumferential interlocking means.

Figure 7 is a perspective view on a reduced scale of my improved pipe covering showing a modified means for joining sections of covering along the length of a pipe in which abutting ends are nested.

Figure 8 is a perspective view of a modified form of my readily mountable pipe covering, in which two pairs of interlocking edges are employed.

Figure 9 is a perspective view of the form of my readily mountable pipe covering shown in Figure 8 with the securing means engaged.

More particularly referring now to the drawings, Figure 3 shows a tube 10 of insulating material being removed from a tapered mandrel 12 on which the tube was formed. The tube 10 may be formed of any type of insulating material which has sufficient structural strength to retain its shape and yet which has some degree of resiliency such that it may be flexed a limited amount without crumbling or delaminating. Preferably, the tube 10 is formed of glass fibers bonded with a binder and molded to a cylindrical form by the method disclosed in application of Joseph F. Stephens et al., Serial No. 318,856, filed November 5, 1952. This material has a very high resistance to heat flow in proportion to its weight, is not fragile or easily broken and has a high degree of resiliency as compared with other types of insulating material.

While the mandrel 12 is preferably tapered to some degree to permit removal of the tube of insulating material therefrom, it can also be a collapsing mandrel or a foraminous mandrel of constant diameter. If I select the mandrel of constant diameter, the tube may be slit on the mandrel and then be removed.

In order to form the longitudinal interlocking means in a wall of the tube 10, after removing the tube from the mandrel, I first place it on an arbor 14. Arbor 14 may conveniently be a plate having a curved surface. The dimensions of the arbor 14 are such that its curved surface will register with the inner surface of tube 10. An appropriately shaped cutter 16 having a cutting edge 18 is mounted on a base 20 and actuated manually or by suitable means known to the art (not shown). Cutter 16 is disposed relative to arbor 14 and tube 10 such that it will cut through or slit the wall of tube 10 longitudinally when moved toward arbor 14.

Cutter 16 will cut the wall of tube 10 to form flaring tongues 22 on either edge of the cut which are separated by corresponding re-entrant portions or notches 24. The relative disposition of the flaring tongues and alternating notches 24 when the tube is sprung apart is illustrated in Figure 1.

It will be appreciated that cutter 16 may be of any shape which will form interlocking means for joining the edges of the cut. For example, it may be of such form as to cut dovetails and corresponding notches. The space between successive flared tongues 22 or dovetails may be selected as desired. I have selected the particular cutter and resultant interlocking means illustrated, since when the edges are joined about a pipe 26 as illustrated in Figure 2, the cut will disappear smoothly and cleanly. That is, when the covering has been applied to a pipe, it will appear as a smooth continuous surface, since there are no sharp corners along the cut. In addition, I have discovered that the form of cut shown provides a simple and expeditious means by which the edges may be joined. When applying the covering, I may merely place the tongues into the corresponding notches in the opposite edge, and there will be a minimum of interference between the cut edges. It will be appreciated that if sharp-cornered dovetails were employed, there would be considerably more interference between the mating edges.

I may form circumferential interlocking means at the ends of sections of my covering to provide a means whereby lengths of pipe covering may be joined along the pipe being covered. To accomplish this, I mount a tube 10 of insulating material on an arbor 28 carried by a freely rotatable shaft 30 as shown in Figure 5. A rotary cutter 32 having cutting edges 34 is mounted on a shaft 36 supported in a bearing bracket 38 and driven by any appropriate means (not shown). Shaft 36 is parallel to shaft 30 and removed therefrom to a distance such that when shaft 36 is rotated, it drives cutter 32 so that the cutting edge 34 makes a cut 40 through the wall of tube 10 around the circumference of the tube as indicated by broken lines in Figure 5. The cut 40 forms flared tongues 41 and intervening notches or re-entrant portions 43 such that the flared tongues 41 of one section are adapted to engage and mate with the corresponding re-entrant portions 43 of an adjacent section. Such cuts may be formed at the ends of each section of tubing and a pair of sections joined in the manner shown in Figure 6. It will be appreciated that any form of cut which provides an interlocking means such as a dovetail and corresponding groove may be formed rather than the peripheral cut shown. The form illustrated has been chosen as the preferred form as in the case of the longitudinal cut.

In Figure 7 I have illustrated a modified means for joining a pair of sections in end-to-end relationship. The tube in this case may be formed at one end with a step or lip 42 by compressing the end from the outside. The other end of the tube may be formed with a corresponding step or lip 44 by compressing the tube radially to approximately half its thickness from the inside during the molding thereof. Thus a pair of sections can be nested in end-to-end relation by the corresponding steps. It is to be noted that the steps could be formed with the interlocking means for engagement with each other by the use of appropriate dies.

In the event that the insulating material from which the covering is to be formed has not sufficient resiliency that it can be sprung into position about a pipe, more than one interlocking cut may be employed to provide the interlocking mating securing means. In Figure 8, one semicylinder 46 has one series of tongues 48 and intervening notches 50 formed along one of its longitudinal edges. On the other longitudinal edge of semicylinder 46 I form similar tongues 52 and intervening notches 54. A second semicylinder 56 has flared tongues 58 and intervening notches 60 formed on one edge and flared tongues 62 and notches 64 on its other longitudinal edge. Tongues 48 are formed to correspond with notches 60 and tongues 58 with notches 50. Likewise, tongues 52 register with notches 64 and tongues 62 register with notches 54. Accordingly, the semicylinders 46 and 56 can be joined one to the other to form a tubular pipe covering in the manner shown in Figure 9, even though the material is but slightly flexible.

Semicylinders 46 and 56 may be formed with their interlocking means from a tube of insulating material by placing such a tube on an arbor and employing a pair of diametrically opposite cutters 16 in a manner similar to the manner illustrated in connection with the form of my invention of Figures 1 to 4. If desired, the semicylinders 46 and 56 may first be molded and then cut with the flared tongues and intervening notches. It will be appreciated that the tongues 48, 52, 58 and 62 could be formed in any suitable shape such as dovetails with corresponding intervening notches if desired, but the form illustrated is the preferred form.

It will be appreciated that my improved pipe covering is not limited to coverings for straight lengths of pipe. By use of appropriate forming molds and cutters, coverings having interlocking securing means can be formed to accommodate any shape pipe fitting, such as an L, T, Y or the like.

In use, in the form of my invention illustrated in Figures 1 to 4 a section of tubular covering 10 is spread apart to open the interlocking cut as shown in Figure 1. The length of covering is slipped about the pipe and the respective tongues 22 of the cut edges are inserted in their corresponding notches 24 in the opposite edges of the cut. This can be simply and expeditiously accomplished by a single workman. The material employed in the form of my invention illustrated in Figures 1 to 4 springs the covering back to substantially cylindrical shape, retaining it about the pipe. When the interlocking means have been engaged, the covering will be securely retained around the pipe.

If it is desired to join a number of sections along the length of a pipe, the tongues formed by the cut at the end of one section are inserted in the corresponding notches formed by a cut 40 at the end of another section. Thus a pair of sections of covering are held in position along the length of the pipe. If desired, the step or lip joint illustrated in Figure 7 may be employed with or without interlocking means and the ends of the sections thus nested or telescoped.

In the form of my invention illustrated in Figures 8 and 9, the semicylinders 46 and 56 are placed about the pipe and tongues 48 engaged in notches 60, tongues 58 engaged in notches 50, tongues 52 engaged in notches 56 and tongues 62 engaged in notches 54. In this manner, the semicylinders 46 and 56 are secured to and retained on the pipe. It is to be noted that in this form of my invention, very little bending is necessary in the bodies of the semicylinders, since they are merely placed on the pipe and an interlocking means engaged. As a consequence, a relatively stiff material may be readily secured.

It will be appreciated also that the circumferential interlocking means for joining sections of covering shown in Figures 5 to 7 may be used in conjunction with the form of my invention shown in Figures 8 and 9.

It will be seen that I have accomplished the objects of my invention. I have provided a readily mountable pipe covering in which the means for retaining the covering on and securing the covering to the pipe is formed from the insulating material of which the covering itself is composed. My readily mountable pipe covering may be secured to and retained on a pipe without the necessity of employing any securing and retaining means separate from the covering itself. I have provided one form of my invention in which a single set of interlocking means is formed longitudinally of the pipe covering. This form is adapted to be employed where the covering is formed of an insulating material having the property of circumferential resiliency so that it may be sprung onto the pipe. I have provided a second form of my invention for use where the covering is formed of a relatively rigid insulating material wherein diametrically opposite longitudinally extending interlocking means provide the means for securing the covering to and retaining the covering on the pipe. In addition, I have disclosed sections of pipe covering having corresponding interlocking means at their ends so that the sections may be joined along a length of pipe in end-to-end relationship. My invention provides a readily mountable pipe covering complete in itself which may be secured to a pipe without the use of any fastening means independent of the covering itself.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A single piece, preformed, insulating pipe covering comprising a tube of resilient insulating material having a single longitudinally extending cut in the wall thereof and interlocking means formed on the adjacent edges of said cut for securing said covering to and retaining said covering on the pipe to which it is applied, said resilient material being homogeneous and being formed of glass fibers bonded with a synthetic resin and molded to cylindrical form and having the property of springing back into substantially cylindrical form after being spread apart along said single longitudinally extending cut.

2. Insulating pipe covering as in claim 1 wherein said interlocking means includes flared tongues and corresponding notches.

3. Insulating pipe covering as in claim 1 including a second tube of insulating material, each of said tubes being formed with complementary interfitting means at its respective ends whereby said tubes may be joined to one another along a length of pipe.

References Cited in the file of this patent

UNITED STATES PATENTS

| | | |
|---|---|---|
| 775,537 | McConnell | Nov. 22, 1904 |
| 896,600 | Thornton | Aug. 18, 1908 |
| 996,926 | Harrington | July 4, 1911 |
| 1,355,083 | Marsh | Oct. 5, 1920 |
| 2,110,183 | Tubbs | Mar. 8, 1938 |